United States Patent
Fan et al.

(10) Patent No.: US 12,014,144 B2
(45) Date of Patent: Jun. 18, 2024

(54) METHODS AND SYSTEMS FOR AUTOMATIC CALL DATA GENERATION

(71) Applicant: INTUIT INC., Mountain View, CA (US)

(72) Inventors: Zhewen Fan, San Diego, CA (US); Byungkyu Kang, San Diego, CA (US); Wan Yu Zhang, Mountain View, CA (US); Carlos A. Oliveira, Mountain View, CA (US); Wenxin Xiao, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 365 days.

(21) Appl. No.: 17/390,573

(22) Filed: Jul. 30, 2021

(65) Prior Publication Data

US 2023/0030405 A1 Feb. 2, 2023

(51) Int. Cl.
*G06F 40/30* (2020.01)
*G06F 16/38* (2019.01)
*G06F 18/22* (2023.01)
*G06F 40/279* (2020.01)
*G10L 15/19* (2013.01)
(Continued)

(52) U.S. Cl.
CPC .............. *G06F 40/30* (2020.01); *G06F 16/38* (2019.01); *G06F 18/22* (2023.01); *G06F 40/279* (2020.01); *G10L 15/19* (2013.01); *G10L 15/22* (2013.01); *H04M 3/51* (2013.01)

(58) Field of Classification Search
None
See application file for complete search history.

(56) References Cited

U.S. PATENT DOCUMENTS

| 10,764,431 B1 * | 9/2020 | Pham ................... H04M 3/5166 |
| 2016/0100050 A1 * | 4/2016 | VanBlon ................. H04W 4/16 |
| | | 455/415 |

(Continued)

OTHER PUBLICATIONS

Biswas et al., "Extractive Summarization of Call Transcripts", AI & Data Science, Global Network and Technology, Verizon Communcia­tions, 2021.

(Continued)

*Primary Examiner* — Nafiz E Hoque
(74) *Attorney, Agent, or Firm* — DLA Piper LLP (US)

(57) ABSTRACT

A processor may receive a call transcript including text and form a text string including at least a portion of the text. The processor may generate a situation description of the call transcript, which may comprise processing the text string using a transformer-based machine learning model. The processor may generate a trouble description of the call transcript, which may comprise creating a sentence embed­ding of the situation description, creating sentence embed­dings for a plurality of utterances within the portion of the text, determining respective similarities between the sen­tence embedding of the situation description and each of the sentence embeddings for each respective one of the plurality of utterances, and selecting at least one of the plurality of utterances having at least one highest determined respective similarity as the trouble description. The processor may store a call summary comprising the situation description and the trouble description in a non-transitory memory.

15 Claims, 8 Drawing Sheets

(51) Int. Cl.
*G10L 15/22* (2006.01)
*H04M 3/51* (2006.01)

(56) References Cited

U.S. PATENT DOCUMENTS

| | | | | |
|---|---|---|---|---|
| 2020/0004803 | A1* | 1/2020 | Dernoncourt | G10L 15/26 |
| 2020/0211709 | A1* | 7/2020 | Devesa | G16H 40/20 |
| 2021/0043211 | A1* | 2/2021 | Leidner | G06F 16/35 |
| 2021/0287683 | A1* | 9/2021 | Nareddy | G06F 3/167 |
| 2021/0337065 | A1* | 10/2021 | Lee | G06Q 30/016 |
| 2022/0383867 | A1* | 12/2022 | Faulkner | H04M 3/42221 |

OTHER PUBLICATIONS

Lemberger, "Deep Learning Models for Automatic Summarization", https://towardsdatascience.com/deep-learning-models-for-automatic-summarization-4c2b89f2a9ea, 17 pages, May 21, 2021.
Lewis et al., BART: Denoising Sequence-to-Sequence Pre-Training for Natural Language Generation, Translation, and Comprehension, arXiv:1910.13461v1 [cs.CL], 10 pages, Oct. 29, 2019.
Raffel et al., "Exploring the Limits of Transfer Learning with a Unified Text-to-Text Transformer", Journal of Machine Learning Research, vol. 21, pp. 1-57, Jul. 28, 2020.
Reimers et al., "Sentence-BERT: Sentence Embeddings Using Siamese BERT-Networks", arXiv:1908.10084v1 [cs.CL], 11 pages, Aug. 27, 2019.
Stepanov et al., "Automatic Summzarization of Call-Center Conversations", European Union—Seventh Framework Program (FP7/2007-2013), Grant Agreement No. 610916 SENSEI.

* cited by examiner

METHODS AND SYSTEMS FOR AUTOMATIC CALL DATA GENERATION

BACKGROUND

Customers call experts for help, for example by calling product hotlines, help desks, customer service centers, etc. Generally, experts create a summary of each call they take, or an automated process creates such a summary. Call summaries are useful for second calls when the customer calls back about the same issue. Having a summary of the previous call helps the expert to expedite the service to the customer, even if a different expert is handling the second call. Creating such summaries manually is laborious and adds handling time to each call. In addition, and because of the laborious nature of the task, some calls have uninformative or empty summaries. At the same time, automated processes for generating call summaries often falter when the calls do not adhere to a rough script, or when there is otherwise a good deal of "noisy" information in the call (e.g., information not obviously relevant to the central topic of the call). Furthermore, many automated processes for generating call summaries are computationally complex, yet still have shortcomings in interpreting noisy or unexpected call discussions.

DETAILED DESCRIPTION OF SEVERAL EMBODIMENTS

Embodiments described herein include transformer-based call summarization systems and methods that remove the burden from product experts to create summaries, reducing average handling time, and increasing their productivity. Disclosed automatic solutions provide summarization coverage for all calls, regardless of call format, filling the gap created by uninformative or empty notes.

For example, when a customer calls an expert, the call can be recorded. Embodiments described herein can receive a call transcript including text and form a text string including at least a portion of the text. The transcript can include utterances by one or both parties to the call (e.g., the customer only, both the customer and the expert), and can include all utterances in the call or some subset thereof (e.g., the first X minutes' worth of utterances, the last Y minutes' worth of utterances, first or last Z number of utterances, etc.). Disclosed systems and methods generate a situation description of the call transcript and a trouble description of the call transcript, where each description is generated using different processing techniques, as described herein. A call summary comprising the situation description and the trouble description can be stored in a non-transitory memory and be available if the caller calls back, so that the expert taking the call can understand the issue quickly.

Embodiments disclosed herein improve machine learning (ML) call summary creation through the use of highly parallel processing and by leveraging state of the art natural language processing (NLP) models and algorithms. Unlike other automated approaches where a framework of summaries must be used (e.g., STAR—situation, trouble, action, resolution) to create labeled data that can be used with ML processing, the disclosed systems and methods need not follow the STAR framework or any other set framework and therefore do not generate structured summaries that are labeled and used for ML training. Indeed, disclosed embodiments can successfully process call data that is "noisier" than data in a STAR format (e.g., a loose, non-specific format of a summary). Disclosed embodiments improve upon ML call summary techniques by providing a different way to generate training data and solve the problem of automating call summary generation with ML techniques. The training data used herein can have more noise than the STAR training data. Furthermore, the disclosed embodiments can realize compute cost savings around 80% compared to rigid, labeled-data based systems, with 100× reduction in timeout errors.

Figure 1:
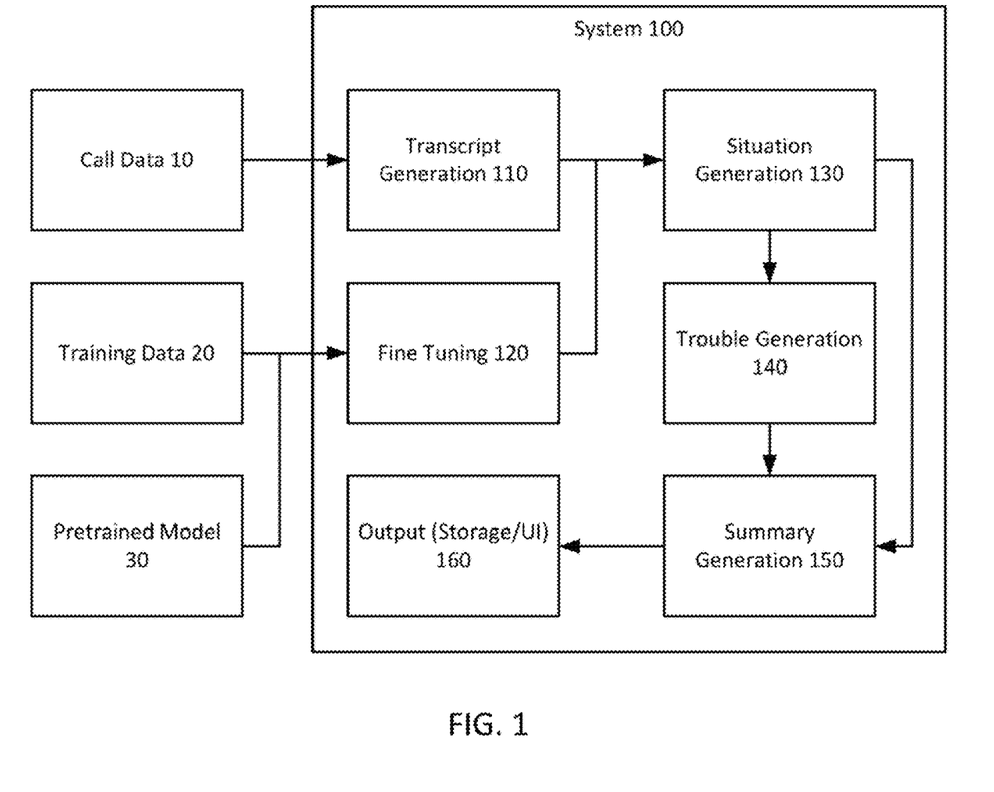
FIG. 1 shows an example call summarization system according to some embodiments of the disclosure.

FIG. 1 shows an example call summarization system according to some embodiments of the disclosure. System 100 may include a variety of hardware, firmware, and/or software components that interact with one another to automatically generate call summaries from call data 10. For example, system 100 includes transcript generation 110, fine tuning 120, situation generation 130, trouble generation 140, summary generation 150, and output (e.g., storage and/or user interface (UI)) 160 components, each of which may be implemented by one or more computers (e.g., as described below with respect to FIG. 8).

As described in detail below, call data 10 may be recorded during calls by system 100 and/or by external systems (not shown). This call data 10 may be supplied to system 100, which may generate a transcript of the call using transcript generation 110 and perform further processing, described in detail below, to create a summary of the call. In some embodiments, transcript generation 110 can be external to system 100 (not shown), and system 100 can receive the call transcript instead of the call data 10.

System 100 can fine-tune a pretrained ML model 30 using training data 20 by fine tuning 120, and situation generation 130 can use the fine-tuned model and transcript to summarize the situation of the call, where the "situation" is a brief description of the issue the caller was interested in discussing. The situation, and additional ML processing, may be used by trouble generation 140 to summarize the trouble of the call, where the "trouble" is a more detailed statement of the problem being experienced by the caller. Summary generation 150 can combine the situation and trouble components into a call summary, and output 160 can store the summary in memory and/or provide the summary to expert(s) in a UI, for example in the case where the caller calls again.

Figure 2:
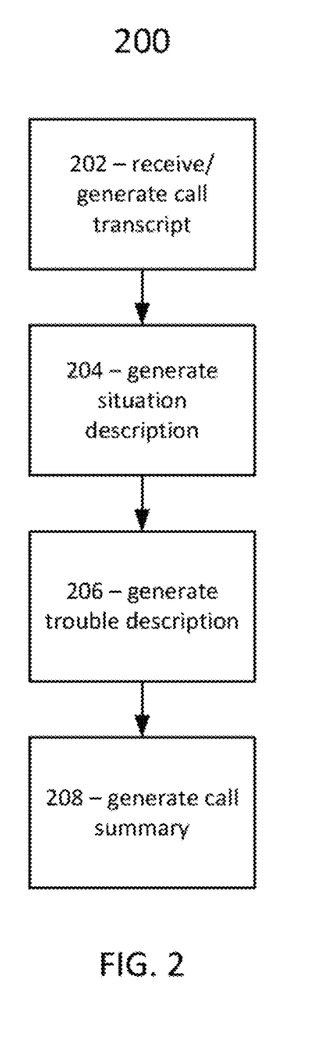
FIG. 2 shows an example automatic call summarization process according to some embodiments of the disclosure.
Figure 3:
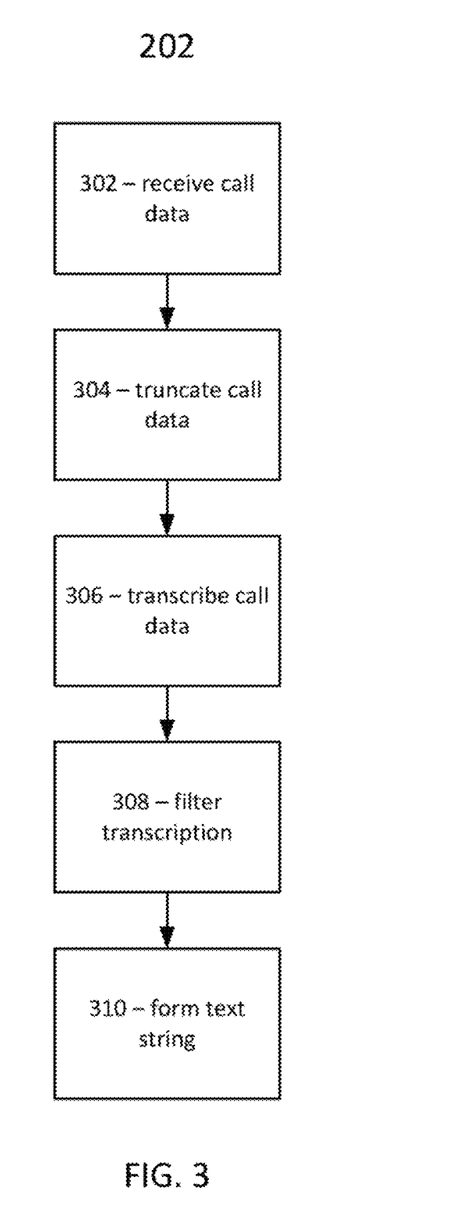
FIG. 3 shows an example call transcript generation process according to some embodiments of the disclosure.

For example, FIG. 2 shows an example automatic call summarization process 200 according to some embodiments of the disclosure. At 202, system 100 can receive and/or generate the call transcript data using transcript generation 110, as described in greater detail below with respect to FIG.

3. At 204, system 100 can generate the situation description data using situation generation 130, as described in greater detail below with respect to FIG. 4. At 206, system 100 can generate the trouble description data using trouble generation 140, as described in greater detail below with respect to FIG. 5. At 208, system 100 can generate the summary data using summary generation 150, as described in greater detail below with respect to FIG. 6.

Returning to FIG. 1, system 100 and individual elements of system 100 (transcript generation 110, fine tuning 120, situation generation 130, trouble generation 140, summary generation 150, and output 160) are each depicted as single blocks for ease of illustration, but those of ordinary skill in the art will appreciate that these may be embodied in different forms for different implementations. For example, system 100 may be provided by a single device or plural devices, and/or any or all of its components may be distributed across multiple devices. In another example, while transcript generation 110, fine tuning 120, situation generation 130, trouble generation 140, summary generation 150, and output 160 are depicted separately, any combination of these elements may be part of a combined hardware, firmware, and/or software element. Moreover, some processing may be offloaded to computing systems external to system 100 (e.g., transcript generation 110) in some embodiments.

FIG. 3 shows an example call transcript generation process 202 according to some embodiments of the disclosure. Transcript generation 110 and/or other elements of system 100 may perform call transcript generation process 202 to convert an audio recording of a call into a form that can be used to generate a call summary. In some embodiments, portions of call transcript generation process 202 may be performed by external services, as noted below.

At 302, system 100 can receive call data. When a person calls an expert agent, the call may be recorded. For example, an audio recording may be captured and stored in a memory accessible to system 100.

At 304, system 100 can truncate the call data in some embodiments. For example, system 100 can identify a relevant portion of the audio recording and select only the relevant portion of the audio recording for further processing. This may include, for example, selecting a most recent portion of a predetermined length of the audio recording as the relevant portion, such as the last 5 minutes, last 10 minutes, last 20 minutes, etc. Other embodiments could select the oldest portion of a predetermined length, such as the first 5 minutes, first 10 minutes, first 20 minutes, etc. In any case, truncating the audio may allow call transcription to process less data but still produce a transcript meaningful enough to generate a summary.

At 306, system 100 can automatically transcribe the relevant portion of the audio recording as given by the filtered call data. In some embodiments, system 100 can include its own audio processing software and/or hardware that can generate text transcripts of audio waveforms. In some embodiments, system 100 can send the audio recording to an external service (e.g., Amazon Transcribe), which returns a text transcript. The transcript can include what was said (e.g., utterances line by line), who said it (e.g., customer or expert, for each utterance), and a timestamp for each utterance.

At 308, system 100 can filter the transcription. By filtering, system 100 can generate a smaller amount of data for training and/or analysis that can still be useful for determining a summary of the call. In some embodiments (e.g., embodiments wherein system 100 did not truncate call data at 304), system 100 can remove all but the last ten minutes of the call transcript (or some other length of time), for example. In some embodiments, system 100 can filter out all expert utterances, leaving only the customer utterances. In some embodiments, system 100 can filter out stop words, or other redundant words, such as "huh" or "mhm" and/or system generated utterances like "you were on hold." Some embodiments may employ both filtering techniques together. Other embodiments may filter according to other criteria.

At 310, system 100 can form a text string including at least a portion of the text from the filtered transcription. The text string may be used as input to one or more ML models, as described in detail below. In some embodiments, the forming of the text string comprises adding metadata to the text string, the metadata being related to the call from which the call transcript was taken. For example, each transcript may have information about the queue it belongs to (e.g., automatic routing of calls puts one call into login queue, another into 1099 queue, etc.). Strings identifying the queue can be added to the text string (e.g., "PCG consumer group—Lucerne") to give the ML model further information to influence the model in its predictions. Other strings (e.g., time stamps, geographic data on the caller, identifying information of the caller, etc.) may be added to the overall text string in other embodiments, similarly to influence the ML model's predictions.

Figure 4:
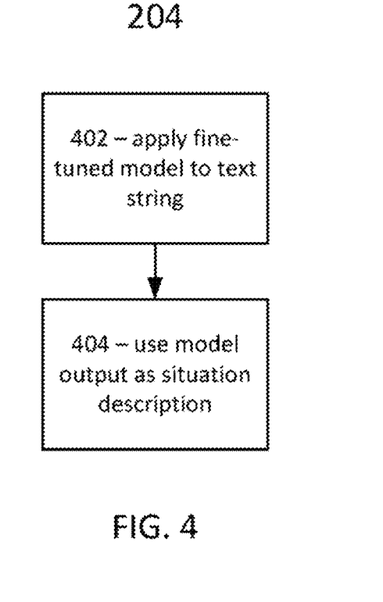
FIG. 4 shows an example situation description generation process according to some embodiments of the disclosure.

FIG. 4 shows an example situation description generation process 204 according to some embodiments of the disclosure. Situation generation 130 and/or other elements of system 100 may perform situation description generation process 204 to generate a situation description that can be included in a call summary and/or can be used as part of the process to generate a trouble description for the call summary as described below.

At 402, system 100 can apply a fine-tuned ML model to the text string generated by process 202. For example, the ML model can be a transformer-based machine learning model. A transformer is a natural language processing (NLP) model that uses a mechanism called self-attention. More generally, a transformer is a deep learning model that adopts the mechanism of attention, differentially weighing the significance of each part of the input data. In some embodiments, system 100 may use a sequence-to-sequence transformer with a bidirectional encoder and auto-regressive decoder (BART). Additionally, or alternatively to BART, embodiments may use text to text transfer transformer (T5) and/or any other encoder/decoder or sequence to sequence pretrained transformer. The transformer can be initially trained using generic text and then further fine-tuned using text specific to the conversations that take place in calls between customers and experts for which summaries are being created. An example ML training process with fine-tuning is described in detail below with respect to FIG. 7.

At 404, system 100 can use the output of processing at 402 as the situation description. The output of processing at 402 can be a sequence, for example a sentence which is a sequence of words. Other ML systems may also have predicted sequences (e.g., sentences), but using different algorithms. The disclosed embodiments can cope with noise very well by leveraging the transformer and its generic pretraining, in addition to the customized training for the particular call environment. The sentence is an abstraction of the input, not necessarily a sentence that exists in the input. The abstraction of the input serves as a high-level description of the call, i.e., a "situation." As described in detail below, the situation itself can go into the final call summary and can also be used to help generate the trouble description.

Figure 5:
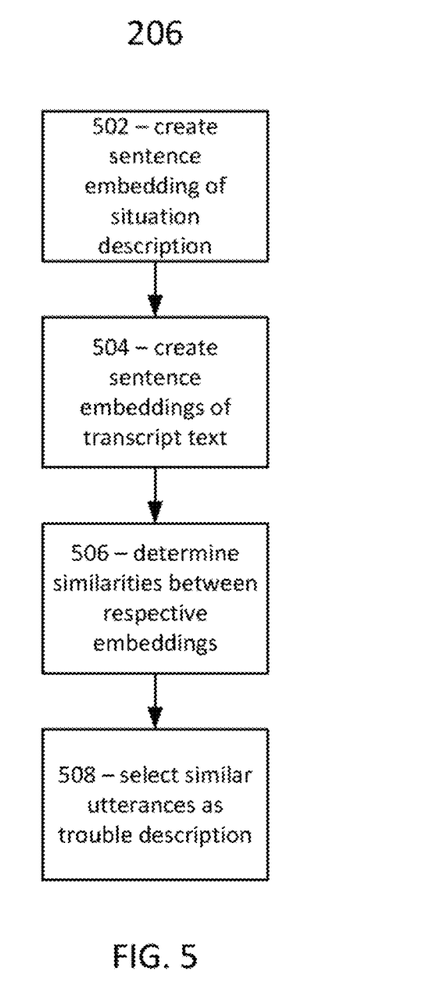
FIG. 5 shows an example trouble description generation process according to some embodiments of the disclosure.

FIG. 5 shows an example trouble description generation process 206 according to some embodiments of the disclosure. Trouble generation 140 and/or other elements of system 100 may perform trouble description generation process 206 to generate a trouble description that can be included in a call summary, thereby adding more specific details to the call summary beyond the situation description.

At 502, system 100 can create a sentence embedding of the situation description. For example, system 100 can use a sentence transformer algorithm to create the sentence embedding. System 100 can use any known or proprietary sentence transformer algorithm, and the sentence transformer algorithm need not be fine-tuned in some embodiments. The sentence embedding maps the situation description to a numerical representation.

At 504, system 100 can create sentence embeddings for a plurality of utterances within the portion of the text used to form the text string, where each utterance can be a portion of the text string separated from the other portions thereof by punctuation (e.g., by a period). For example, system 100 can use the same sentence transformer algorithm that was used at 502. The sentence embedding maps each of the plurality of utterances to a separate respective numerical representation.

At 506, system 100 can determine respective similarities between the sentence embedding of the situation description and each of the sentence embeddings for each respective one of the plurality of utterances. Because each sentence embedding under comparison is a numerical representation, a variety of mathematical similarities may be used. For example, some embodiments may use a pairwise cosine similarity function to determine which of the utterances are most similar to the situation description. Other embodiments may use distribution-based similarity algorithms or any other algorithms that perform comparison of two vectors. As a result of the determination, system 100 may have a set or list of similarity scores or rankings for each of the utterances relative to the situation description.

At 508, system 100 can select at least one of the plurality of utterances having at least one highest determined respective similarity as the trouble description. For example, system 100 can select the highest-ranked utterance from 506, the top two highest-ranked utterances, top three highest-ranked utterances, or any number thereof. System 100 can extract the selected utterances verbatim as the trouble description. In addition and/or alternatively to using the utterances verbatim, some embodiments may use NLP or other techniques to create a different summary using the extracted utterances to form the trouble description.

By using a sentence transformer and a mathematical comparison to generate the trouble description as described above, the embodiments disclosed herein can avoid the use of a custom-trained model or set of models for trouble description, thereby improving computer performance and speed. For example, other systems use a sentence transformer to create a cosine simulation between utterances and case notes, and then use cosine similarity as a target variable to train another model. That trained model then tries to create a summary without case notes. Clearly, this is a much more processing-intensive technique than that disclosed above and, while both use sentence transformers, the disclosed embodiments use sentence transformers differently from other techniques.

Figure 6:
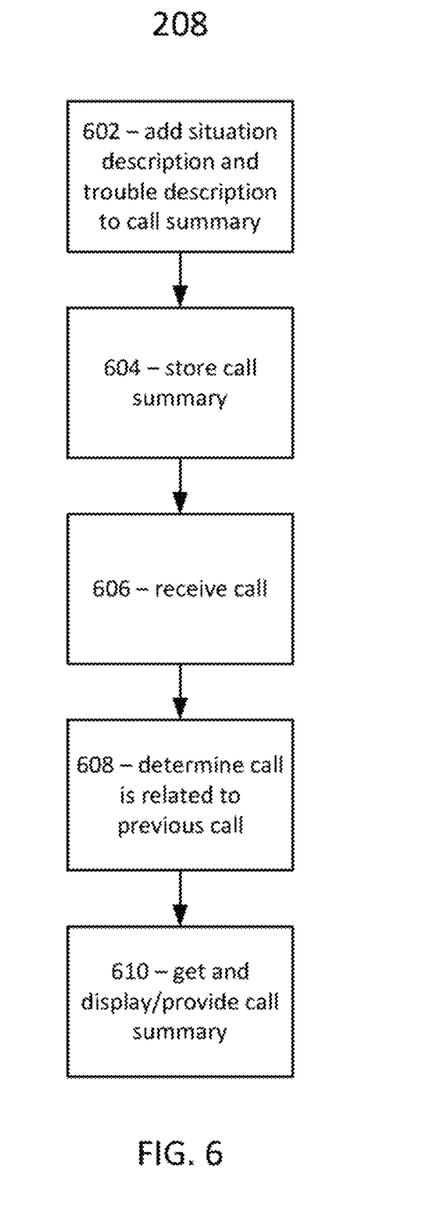
FIG. 6 shows an example call summary generation and use process according to some embodiments of the disclosure.

FIG. 6 shows an example call summary generation and use process 208 according to some embodiments of the disclosure. Summary generation 150, output 160, and/or other elements of system 100 may perform portions of call summary generation and use process 208 to generate and store a call summary. System 100 and/or other systems (e.g., a call-handling system configured to assist experts with processing calls received from customers (not shown)) may perform portions of call summary generation and use process 208 to use the call summary as needed, for example when the same caller calls back about the same issue or a related issue. In some embodiments, system 100 may perform the entire call summary generation and use process 208.

At 602, system 100 can combine the situation description from 204 and the trouble description from 206 into a call summary. An example of a common, human generated summary format is the STAR format. In the STAR format, the portions of a call summary are Situation (brief description of the general issue), Trouble (detailed description of the issue), Action (action taken by the expert to solve the issue), and Resolution (was the issue resolved?). Thus, the call summary can comprise the situation description (a brief description of the issue generated algorithmically) and the trouble description (a more detailed description pulled from the transcript).

At 604, system 100 can store the call summary in a non-transitory memory accessible to at least one call-handling system. The call summary may be labeled with information identifying the caller (e.g., a phone number, an account identifier, a name, other data, and/or a combination thereof). While the examples discussed herein present the case of a single call summary creation, the memory may store multiple summaries of multiple calls, so such labeling may aid in id. The call-handling system may provide UI elements and/or other features assisting experts in taking and responding to calls. System 100 can be an element of the call-handling system, or the call-handling system may be a separate entity. For example, the call-handling system may include a Salesforce product or similar customer relationship management product.

At 606, system 100 and/or call-handling system can receive a phone call after the call summary has been stored. For example, the call may be from the same caller whose previous call was captured in the call summary.

At 608, system 100 and/or call-handling system can determine whether the call is related to a previous call for which a call summary was captured by system 100. For example, the incoming phone number for a call may be matched to an entry in the memory labeled with that phone number, information provided by the caller (e.g., account number, name, etc.) may be matched to an entry in the memory labeled with that information, etc. In some embodiments, the caller may identify the problem, and the problem identified by the caller may be matched to the situation and/or trouble information within the stored call summaries. For example, if one caller has called multiple times, resulting in multiple summaries, system 100 and/or call-handling system may search the call summary contents to determine which of the multiple summaries for the same caller is most relevant. If there is no match between the call and any previous call(s), process 208 may end at this point.

If a related call summary was found at 608, at 610, system 100 and/or call-handling system can retrieve the identified call summary. System 100 and/or call-handling system can provide the call summary to an expert handling the call received at 606. For example, the call summary can be displayed in a UI of a computer being used by the expert (e.g., in a Salesforce UI or other UI).

Figure 7:
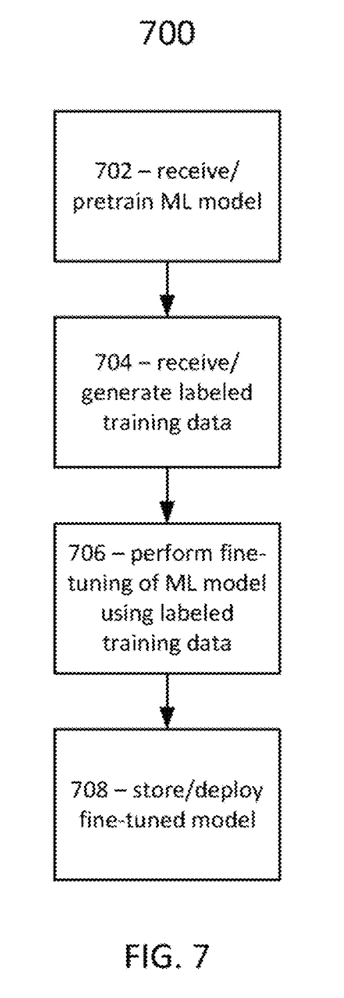
FIG. 7 shows an example training process according to some embodiments of the disclosure.

FIG. 7 shows an example training process 700 according to some embodiments of the disclosure. Fine tuning 120 and/or other elements of system 100 may perform training process 700 to perform fine-tuning training of a pretrained transformer, thereby improving the performance of the transformer for the situation description generation process 204.

At 702, system 100 can receive and/or pretrain the ML model (e.g., the transformer). System 100 can fine tune a pre-trained transformer. As noted above, a transformer is an NLP model that uses a mechanism called self-attention. More generally, a transformer is a deep learning model that adopts the mechanism of attention, differentially weighing the significance of each part of the input data. In some embodiments, system 100 may use BART, T5, or a similar transformer. The transformer can be pretrained on massive amounts of text data available from open sources, for example, to gain a general probabilistic understanding of natural language. System 100 can load a pretrained transformer model 30 from an external source, or in some embodiments, system 100 can perform the pretraining itself using the open-source text data as training data and/or using proprietary transcript data as training data.

At 704, system 100 can receive and/or generate labeled training data 20 for fine tuning the ML model. For example, system 100 can load historical call transcripts that have expert typed summaries. In some embodiments, these transcripts may also be manually labeled. Alternatively and/or additionally, system 100 can perform automatic labeled data generation. For example, system 100 may apply the following heuristic filters to the historical call transcripts:

Consider only calls having a summary including at least 2 sentences and at least 10 words (or some other constraints);
Consider only calls having summaries that are unique;
Consider only calls having summaries starting with "ex" or "customer" (or some other keyword or keyphrase).

The above filters can help to exclude summaries that are uninformative and that represent high noise for the ML fine-tuning training that follows in process 700. This aims at creating a training dataset with high quality summaries. In some embodiments, system 100 may avoid the use of complete summaries because they can have a great deal of noise. Accordingly, system 100 can use only the first sentence of selected summaries, which may describe the "situation," as the training data. Once a selection of training data is generated, process 700 can proceed to fine-tuning.

At 706, system 100 can perform fine-tuning of the ML model 30 using the labeled training data 20 from 704. As a result of labeling at 704, system 100 may have high quality labeled notes to be used as a training set. System 100 can train the pretrained model 30 further, using the labeled training data 20, thus customizing the model for highly effective classifying of text strings having similar information as the training data 20 (e.g., calls between customers and experts). The X input of the ML model may be the text string of customer speech as presented in the filtered transcript. The Y input of the model may be high quality labeled summaries (e.g., the fine-tuning training data 20 as described above).

At 708, system 100 can store and/or deploy the fine-tuned model. For example, system 100 can store the trained model in a memory that is accessible to process 204 for analysis of text strings from received calls. With a model trained as described above, system 100 can get a transcript of a call as described above and then process the transcript of the new call against the trained model.

Figure 8:
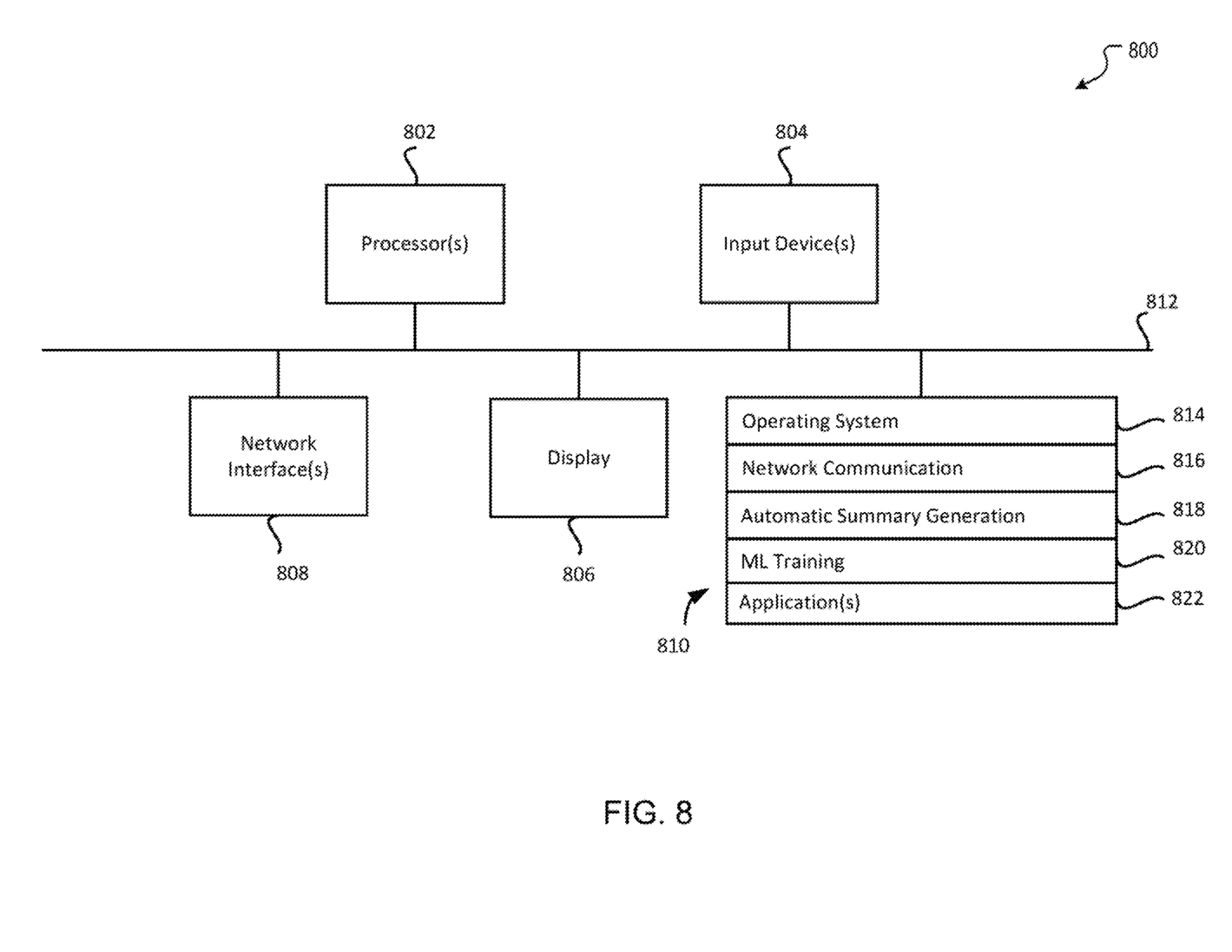
FIG. 8 shows a computing device according to some embodiments of the disclosure.

FIG. 8 shows a computing device 800 according to some embodiments of the disclosure. For example, computing device 800 may function as system 100 or any portion(s) thereof, or multiple computing devices 800 may function as system 100.

Computing device 800 may be implemented on any electronic device that runs software applications derived from compiled instructions, including without limitation personal computers, servers, smart phones, media players, electronic tablets, game consoles, email devices, etc. In some implementations, computing device 800 may include one or more processors 802, one or more input devices 804, one or more display devices 806, one or more network interfaces 808, and one or more computer-readable mediums 810. Each of these components may be coupled by bus 812, and in some embodiments, these components may be distributed among multiple physical locations and coupled by a network.

Display device 806 may be any known display technology, including but not limited to display devices using Liquid Crystal Display (LCD) or Light Emitting Diode (LED) technology. Processor(s) 802 may use any known processor technology, including but not limited to graphics processors and multi-core processors. Input device 804 may be any known input device technology, including but not limited to a keyboard (including a virtual keyboard), mouse, track ball, and touch-sensitive pad or display. Bus 812 may be any known internal or external bus technology, including but not limited to ISA, EISA, PCI, PCI Express, NuBus, USB, Serial ATA or FireWire. In some embodiments, some or all devices shown as coupled by bus 812 may not be coupled to one another by a physical bus, but by a network connection, for example. Computer-readable medium 810 may be any medium that participates in providing instructions to processor(s) 802 for execution, including without limitation, non-volatile storage media (e.g., optical disks, magnetic disks, flash drives, etc.), or volatile media (e.g., SDRAM, ROM, etc.).

Computer-readable medium 810 may include various instructions 814 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 804; sending output to display device 806; keeping track of files and directories on computer-readable medium 810; controlling peripheral devices (e.g., disk drives, printers, etc.) which can be controlled directly or through an I/O controller; and managing traffic on bus 812. Network communications instructions 816 may establish and maintain network connections (e.g., software for implementing communication protocols, such as TCP/IP, HTTP, Ethernet, telephony, etc.).

Automatic summary generation 818 may include the system elements and/or the instructions that enable computing device 800 to perform the processing of system 100 as described above (e.g., as shown in FIGS. 2-6). ML training 820 may include the system elements and/or the instructions that enable computing device 800 to perform the ML training as described above (e.g., as shown in FIG. 7). Application(s) 822 may be an application that uses or implements the outcome of processes described herein and/or other processes. For example, application(s) 822 may include Salesforce software or other customer relationship management software that uses the call summaries as described above. In some embodiments, the various processes may also be implemented in operating system 814.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java, Python, etc.), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose (e.g., GPU) microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
    receiving, by a processor, a call transcript including text;
    forming, by the processor, a text string including at least a portion of the text;
    generating, by the processor, a situation description of the call transcript, the generating of the situation description comprising processing the text string using a fine-tuned transformer-based machine learning model;
    generating, by the processor, a trouble description of the call transcript, the generating of the trouble description comprising:
        creating, using a sentence transformer algorithm, a sentence embedding of the situation description,
        creating, using the sentence transformer algorithm, sentence embeddings for a plurality of utterances within the portion of the text,
        determining respective similarities between the sentence embedding of the situation description and each of the sentence embeddings for each respective one of the plurality of utterances, and selecting at least one of the plurality of utterances having at least one highest determined respective similarity as the trouble description; and storing, by the processor, a call summary comprising the situation description and the trouble description in a non-transitory memory accessible to at least one call-handling system, wherein the fine-tuned transformer-based machine learning model is fine tuned by a process comprising:

receiving the transformer-based machine learning model in a pretrained state wherein the transformer-based machine learning model has been previously trained with generic text, generating labeled call summaries by receiving unlabeled call summaries, selecting at least one of the unlabeled call summaries starting with a keyword or keyphrase, and selecting respective excerpts of each of the selected at least one of the unlabeled call summaries for inclusion within the labeled call summaries, and performing further training on the transformer-based machine learning model in the pretrained state using the labeled call summaries.

2. The method of claim 1, further comprising:
generating, by the processor, the call transcript, the generating of the call transcript comprising:
selecting a subset of an audio recording of a call as a reduced portion of the audio recording, and
automatically transcribing only the reduced portion of the audio recording.

3. The method of claim 2, wherein the identifying comprises selecting a most recent portion of a predetermined length of the audio recording as the reduced portion or selecting an oldest portion of the predetermined length of the audio recording as the reduced portion.

4. The method of claim 1, wherein the forming of the text string comprises adding metadata to the text string, the metadata being related to a call from which the call transcript was taken.

5. The method of claim 1, wherein the determining of the respective similarities is performed using a pairwise cosine similarity function.

6. The method of claim 1, further comprising:
receiving a second call;
determining, by the processor, that the second call is related to the call transcript; and
providing, by the processor, the call summary in a user interface.

7. A system comprising:
a processor; and
a non-transitory memory in communication with the processor, the non-transitory memory storing instructions that, when executed by the processor, cause the processor to perform processing comprising:
receiving a call transcript including text;
forming a text string including at least a portion of the text;
generating a situation description of the call transcript, the generating of the situation description comprising processing the text string using a fine-tuned transformer-based machine learning model;
generating a trouble description of the call transcript, the generating of the trouble description comprising:
creating, using a sentence transformer algorithm, a sentence embedding of the situation description, creating, using the sentence transformer algorithm, sentence embeddings for a plurality of utterances within the portion of the text, determining respective similarities between the sentence embedding of the situation description and each of the sentence embeddings for each respective one of the plurality of utterances, and selecting at least one of the plurality of utterances having at least one highest determined respective similarity as the trouble description; and storing a call summary comprising the situation description and the trouble description in the non-transitory memory, wherein the fine-tuned transformer-based machine learning model is fine tuned by a process comprising:

receiving the transformer-based machine learning model in a pretrained state wherein the transformer-based machine learning model has been previously trained with generic text, generating labeled call summaries by receiving unlabeled call summaries, selecting at least one of the unlabeled call summaries starting with a keyword or keyphrase, and selecting respective excerpts of each of the selected at least one of the unlabeled call summaries for inclusion within the labeled call summaries, and performing further training on the transformer-based machine learning model in the pretrained state using the labeled call summaries.

8. The system of claim 7, wherein the processing further comprises:
generating the call transcript, the generating of the call transcript comprising:
selecting a subset of an audio recording of a call as a reduced portion of the audio recording, and
automatically transcribing only the reduced portion of the audio recording.

9. The system of claim 8, wherein the identifying comprises selecting a most recent portion of a predetermined length of the audio recording as the reduced portion or selecting an oldest portion of the predetermined length of the audio recording as the reduced portion.

10. The system of claim 7, wherein the forming of the text string comprises adding metadata to the text string, the metadata being related to a call from which the call transcript was taken.

11. The system of claim 7, wherein the determining of the respective similarities is performed using a pairwise cosine similarity function.

12. The system of claim 7, wherein the processing further comprises:
receiving a second call;
determining that the second call is related to the call transcript; and
providing the call summary in a user interface.

13. A method comprising:
receiving, at a processor, a transformer-based machine learning model in a pretrained state wherein the transformer-based machine learning model has been previously trained with generic text;
generating, by the processor, labeled call summaries, the generating of the labeled call summaries comprising:
receiving unlabeled call summaries,
selecting at least one of the unlabeled call summaries starting with a keyword or keyphrase, and selecting respective excerpts of each of the selected at least one of the unlabeled call summaries for inclusion within the labeled call summaries;

performing, by the processor, further training on the transformer-based machine learning model in the pre-trained state using the labeled call summaries;

receiving, at the processor, a call transcript including text;

forming, by the processor, a text string including at least a portion of the text;

generating, by the processor, a situation description of the call transcript, the generating of the situation description comprising processing the text string using the transformer-based machine learning model; and storing, by the processor, a call summary comprising the situation description in a non-transitory memory accessible to at least one call-handling system.

14. The method of claim 13, further comprising:

generating, by the processor, a trouble description of the call transcript, the generating of the trouble description comprising:

creating, using a sentence transformer algorithm, a sentence embedding of the situation description, creating, using the sentence transformer algorithm, sentence embeddings for a plurality of utterances within the portion of the text, determining respective similarities between the sentence embedding of the situation description and each of the sentence embeddings for each respective one of the plurality of utterances, and selecting at least one of the plurality of utterances having at least one highest determined respective similarity as the trouble description; and including, by the processor, the trouble description in the call summary stored in the non-transitory memory.

15. The method of claim 14, wherein the determining of the respective similarities is performed using a pairwise cosine similarity function.

\* \* \* \* \*